United States Patent
Bagheri et al.

(10) Patent No.: US 12,069,687 B2
(45) Date of Patent: *Aug. 20, 2024

(54) METHOD AND APPARATUS FOR MONITORING CONTROL CHANNEL CANDIDATES

(71) Applicant: Lenovo (Singapore) Pte. Ltd., New Tech Park (SG)

(72) Inventors: Hossein Bagheri, Urbana, IL (US); Hyejung Jung, Northbrook, IL (US); Vijay Nangia, Woodridge, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 342 days.

This patent is subject to a terminal disclaimer.

(21) Appl. No.: 17/584,175

(22) Filed: Jan. 25, 2022

(65) Prior Publication Data

US 2022/0150876 A1   May 12, 2022

Related U.S. Application Data

(63) Continuation of application No. 16/836,748, filed on Mar. 31, 2020, now Pat. No. 11,265,866.

(Continued)

(51) Int. Cl.
*H04W 72/23* (2023.01)
*H04W 72/04* (2023.01)
*H04W 72/0453* (2023.01)

(52) U.S. Cl.
CPC ....... *H04W 72/23* (2023.01); *H04W 72/0453* (2013.01)

(58) Field of Classification Search
CPC .................. H04W 72/23; H04W 72/0453
See application file for complete search history.

(56) References Cited

U.S. PATENT DOCUMENTS

2014/0064205 A1   3/2014   Feng et al.
2020/0351896 A1*  11/2020  Boroujeni ............. H04L 1/0045

OTHER PUBLICATIONS

Nokia et al: "Remaining details on RACH procedure", 3GPP Draft; R1-1806923, Remaining Details on RACH Procedure, 3rd Generation Partnership Project (3GPP), Mobile Competence Centre; 650, Route Des Lucioles; F-06921 Sophia-Antipolis Cedex; France vol. RAN WG1, No. Busan, Korea; May 21, 2018-May 25, 2018May 11, 2018 (May 11, 2018).

(Continued)

*Primary Examiner* — Ronald B Abelson
(74) *Attorney, Agent, or Firm* — Loppnow & Chapa; Matthew C. Loppnow

(57) ABSTRACT

A configuration of a first search space for monitoring control channel candidates over a first set of symbols can be transmitted. A configuration of an alternative set of search spaces containing at least a second search space for monitoring control channel candidates over a second set of symbols can be transmitted. Control channel candidates can be monitored in the first search space when an uplink transmission does not overlap with the first set of symbols. Control channel candidates can be monitored in the second search space instead of the first search space when the uplink transmission overlaps with the first set of symbols. Downlink control information scheduling an uplink transmission over a third set of symbols can be transmitted, where a determination is made as to whether the uplink transmission overlaps with the first set of symbols.

20 Claims, 7 Drawing Sheets

Related U.S. Application Data

(60) Provisional application No. 62/828,407, filed on Apr. 2, 2019.

(56) References Cited

OTHER PUBLICATIONS

Anghel, European Search Report, European Application No. EP 23 16 9682, European Patent Office, Munich, Germany, Aug. 8, 2023.

* cited by examiner

METHOD AND APPARATUS FOR MONITORING CONTROL CHANNEL CANDIDATES

BACKGROUND

1. Field

The present disclosure is directed to a method and apparatus for communicating on a wireless network. More particularly, the present disclosure is directed to monitoring control channel candidates.

2. Introduction

Presently, wireless communication devices, such as User Equipment (UE), communicate with other communication devices using wireless signals. To support Ultra Reliable Low Latency Communication (URLLC), more Physical Downlink Control Channel (PDCCH) monitoring opportunities, in terms of the number of non-overlapping Control Channel Elements (CCEs) or number of Blind Decodes (BDs) in a slot, are needed to satisfy the latency requirements for some of the URLLC use cases.

The time/frequency resources corresponding to Search Spaces (SSs) and their associated Control Resource Set (CORESETs) are configured by a higher layer, leading to higher layer configuration of PDCCH monitoring occasions. In cases that an Uplink (UL) transmission overlaps in the time/frequency resources corresponding to SSs and their associated CORESETs, the corresponding PDCCH monitoring occasion(s) can be wasted as the User Equipment (UE) would not monitor PDCCH candidates there. Such wastage can lead to additional latency in scheduling URLLC traffic depending on how frequent the PDCCH monitoring occasions occur.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Embodiments provide a method and apparatus for communicating on a wireless network. At least some embodiments can provide for enhanced PDCCH monitoring for URLLC. According to a possible embodiment, a configuration of a first SS for monitoring control channel candidates over a first set of symbols can be received. A configuration of an alternative set of SSs containing at least a second SS for monitoring control channel candidates over a second set of symbols can be received. DCI scheduling an UL transmission over a third set of symbols can be received. A determination can be made as to whether the UL transmission overlaps with the first set of symbols. Control channel candidates in the first SS can be monitored when the UL transmission does not overlap with the first set of symbols. Control channel candidates can be monitored in the second SS instead of the first SS when the UL transmission overlaps with the first set of symbols.

Figure 1:
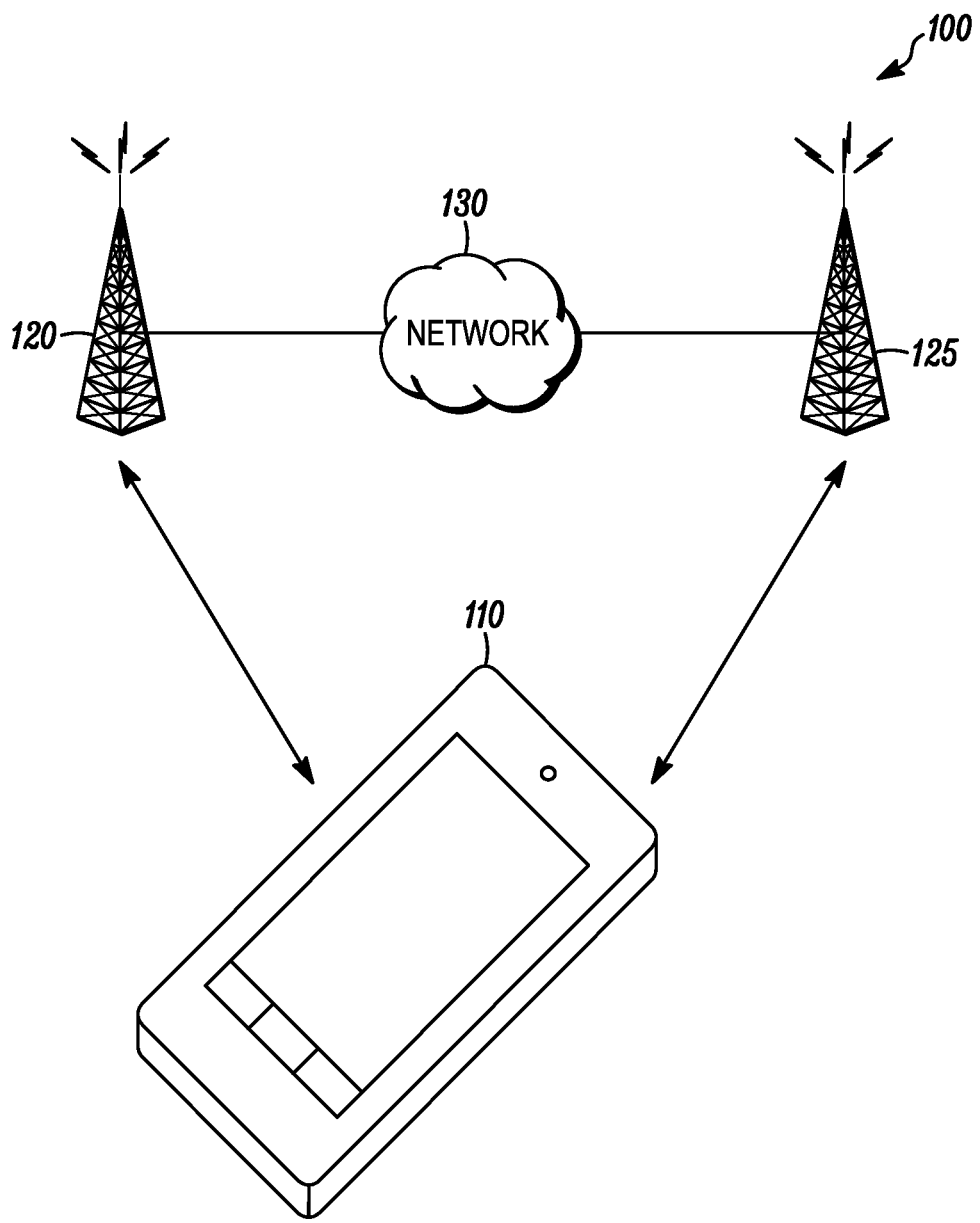
FIG. 1 is an example block diagram of a system according to a possible embodiment.

FIG. 1 is an example block diagram of a system 100 according to a possible embodiment. The system 100 can include a UE 110, at least one network entity 120 and 125, and a network 130. The UE 110 can be a wireless wide area network device, a user device, a wireless terminal, a portable wireless communication device, a smartphone, a cellular telephone, a flip phone, a personal digital assistant, a smartwatch, a personal computer, a tablet computer, a laptop computer, a selective call receiver, an Internet of Things (IoT) device, or any other user device that is capable of sending and receiving communication signals on a wireless network. The at least one network entity 120 and 125 can be a wireless wide area network base station, can be a NodeB, can be an enhanced NodeB (eNB), can be a New Radio (NR) NodeB (gNB), such as a Fifth Generation (5G) NodeB, can be an unlicensed network base station, can be an access point, can be a base station controller, can be a network controller, can be a Transmission/Reception Point (TRP), can be a different type of network entity from the other network entity, and/or can be any other network entity that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a NR network, a 3rd Generation Partnership Project (3GPP)-based network, a 5G network, a satellite communications network, a high altitude platform network, the Internet, and/or other communications networks.

In operation, the UE 110 can communicate with the network 130 via at least one network entity 120. For example, the UE 110 can send and receive control signals on a control channel and user data signals on a data channel.

At least some embodiments can provide methods to reduce the scheduling latency, scheduling activation latency, or scheduling reactivation latency in case of configured UL or Downlink (DL) grant transmissions by monitoring an alternate SS. The alternate SS can be an alternate PDCCH monitoring occasion, which can include occasions not regularly monitored. The alternate SS can be in different time/frequency/carrier resources in case of overlap of a first SS with time-frequency resources of an UL transmission or in general when at least a fraction of a PDCCH candidate can be among those not monitored in a first PDCCH monitoring occasion.

Increased PDCCH monitoring capability can be supported on at least the maximum number of non-overlapped CCEs per slot for channel estimation for at least one Subcarrier Spacing (SCS), which can be subject to restrictions. The restrictions can include an explicit limitation on the maximum number of BDs/non-overlapping CCEs per monitoring occasion and/or per monitoring span. For PDCCH monitoring, there can also be a maximum number of monitored PDCCH candidates per slot for URLLC.

Increasing PDCCH monitoring occasions within a slot can reduce scheduling delays of URLLC operation. Lower SCS, such as 15 KHz, can use more frequent monitoring occasions to satisfy a target latency requirement. To assist with pipelining operation/UE complexity, instead of per-slot constraints on a maximum number of non-overlapping CCEs or maximum number of blind decodes/monitored number of PDCCH candidates, per-half a slot or per a set of symbols constraints can be defined. The same or different constraints, such as numbers of non-overlapping CCEs/number of BDs, can be applied to per half-a-slot or per-set-of-symbols. Counting the number of non-overlapping CCEs/BDs per half-a-slot or per-set-of-symbols, the beginning or the ending symbols of each monitoring occasion can be used as a way to count those CCEs/BDs in each half-a-slot or a set-of-symbols, as Radio Resource Configuration (RRC) configuration can lead to some SSs cross the half-slot or set-of-symbol boundary.

For each SS set index, based on the RRC parameter monitoringSymbolsWithinSlot, the beginning of each PDCCH monitoring occasion, such as the first symbols for the reception of PDCCH candidates, in a slot can be determined.

Table 1 provides the maximum number of monitored PDCCH candidates, $M_{PDCCH}^{max,slot,\mu}$, for a DL Bandwidth Part (BWP) with SCS configuration $\mu$ for a UE per slot for operation with a single serving cell.

TABLE 1

Maximum number $M_{PDCCH}^{max,slot,\mu}$ of monitored PDCCH candidates per slot for a DL BWP with SCS configuration $\mu \in \{0, 1, 2, 3\}$ for a single serving cell

| $\mu$ | Maximum number of monitored PDCCH candidates per slot and per serving cell $M_{PDCCH}^{max,slot,\mu}$ |
|---|---|
| 0 | 44 |
| 1 | 36 |
| 2 | 22 |
| 3 | 20 |

Table 2 provides the maximum number of non-overlapped CCEs, $C_{PDCCH}^{max,slot,\mu}$, for a DL BWP with SCS configuration $\mu$ that a UE can be expected to monitor in corresponding PDCCH candidates per slot for operation with a single serving cell. CCEs for PDCCH candidates can be non-overlapped if they correspond to a different CORESET indexes, or different first symbols for the reception of the respective PDCCH candidates.

TABLE 2

Maximum number $C_{PDCCH}^{max,slot,\mu}$ of non-overlapped CCEs per slot for a DL BWP with SCS configuration $\mu \in \{0, 1, 2, 3\}$ for a single serving cell

| $\mu$ | Maximum number of non-overlapped CCEs per slot and per serving cell $C_{PDCCH}^{max,slot,\mu}$ |
|---|---|
| 0 | 56 |
| 1 | 56 |
| 2 | 48 |
| 3 | 32 |

For each DL BWP configured to a UE in a serving cell, higher layer signalling with P≤3 CORESETs can be provided to a UE. The ControlResourceSet can provide for each CORESET and can include, a CORESET index p, 0≤p<12, by controlResourceSetId, a Demodulation Reference Signal (DM-RS) scrambling sequence initialization value by pdcch-DMRS-ScramblingID, a precoder granularity for a number of Resource Element Groups (REGs) in the frequency domain where the UE can assume use of a same DM-RS precoder by precoderGranularity, a number of consecutive symbols provided by duration, a set of resource blocks provided by frequencyDomainResources, CCE-to-REG mapping parameters provided by cce-REG-Mapping-Type, an antenna port quasi co-location from a set of antenna port quasi co-locations provided by TCI-State indicating quasi co-location information of the DM-RS antenna port for PDCCH reception in a respective CORESET, and an indication for a presence or absence of a Transmission Configuration Indication (TCI) field for Downlink Control Information (DCI) format 1_1 transmitted by a PDCCH in CORESET p, by TCI-PresentInDCI.

When precoderGranularity is equal to allContiguousRBs, a UE may not expect to be configured a set of resource blocks of a CORESET that includes more than four sub-sets of resource blocks that are not contiguous in frequency, and the UE does not expect any Resource Element (RE) of a CORESET to overlap with any RE determined from lte-CRS-ToMatchAround or with any RE of a synchronization signal or Physical Broadcast Channel (PBCH) block.

For each CORESET in a DL BWP of a serving cell, a respective frequencyDomainResources can provide a bitmap. The bits of the bitmap can have a one-to-one mapping with non-overlapping groups of 6 consecutive Physical Resource Blocks (PRBs), in ascending order of the PRB index in the DL BWP bandwidth of $N_{RB}^{BWP}$ PRBs with starting common Resource Block (RB) position $N_{BWP}^{start}$ where the first common RB of the first group of 6 PRBs can have common RB index $6 \cdot \lceil N_{BWP}^{start}/6 \rceil$.

For each DL BWP configured to a UE in a serving cell, the UE can be provided by higher layers with S≤10 SS sets where, for each SS set from the S SS sets, the UE can be provided configuration information by a SearchSpace. SeachSpace can include a SS set index s, 0≤s<40, by searchSpaceId, can include an association between the SS set s and a CORESET p by controlResourceSetId, can include a PDCCH monitoring periodicity of $k_s$ slots and a PDCCH monitoring offset of $o_s$ slots, by monitoringSlotPeriodicityAndOffset, can include a PDCCH monitoring pattern within a slot, indicating first symbol(s) of the CORESET within a slot for PDCCH monitoring, by monitoringSymbolsWithinSlot, can include a duration of $T_s < k_s$ slots indicating a number of slots that the SS set s exists by duration, a number of PDCCH candidates $M_s^{(L)}$ per CCE aggregation level L by aggregationLevel1, aggregationLevel2, aggregationLevel4, aggregationLevel8, and aggregationLevel16, for CCE aggregation level 1, CCE aggregation level 2, CCE aggregation level 4, CCE aggregation level 8, and CCE aggregation level 16, respectively, and can include an indication that SS set s can be either a Common SS (CSS) set or a User specific SS (USS) set by searchSpaceType. If SS set s is a CSS set, then SearchSpace can include an indication by dci-Format0-0-AndFormat1-0 to monitor PDCCH candidates for DCI format 0_0 and DCI format 1_0, can include an indication by dci-Format2-0 to monitor one or two PDCCH candidates for DCI format 2_0 and a corresponding CCE aggregation level, can include an indication by dci-Format2-1 to monitor PDCCH candidates for DCI format 2_1, can include an indication by dci-Format2-2 to monitor PDCCH candidates for DCI format 2_2, and can include an indication by dci-Format2-3 to monitor PDCCH candidates for DCI format 2_3. If the SS set s is a USS set, SearchSpace can include an indication by dci-Formats to monitor PDCCH candidates either for DCI format 0_0 and DCI format 1_0, or for DCI format 0_1 and DCI format 1_1.

If the monitoringSymbolsWithinSlot indicates to a UE to monitor PDCCH in a subset of up to three consecutive symbols that are the same in every slot, where the UE monitors PDCCH for all SS sets, the UE may not expect to be configured with a PDCCH SCS other than 15 kHz if the subset includes at least one symbol after the third symbol.

A UE may not expect to be provided with a first symbol and a number of consecutive symbols for a CORESET that results to a PDCCH candidate mapping to symbols of different slots.

A UE may not expect any two PDCCH monitoring occasions on an active DL BWP, for a same SS set or for different SS sets, in a same CORESET to be separated by a non-zero number of symbols that can be smaller than the CORESET duration.

An information element monitoringSymbolsWithinSlot can indicate the first symbol(s) for PDCCH monitoring in the slots configured for PDCCH monitoring. The most significant, that is the left most, bit can represent the first OFDM in a slot, and the second most significant bit can represent the second OFDM symbol in a slot and so on. The bit(s) set to one can identify the first OFDM symbol(s) of the control resource set within a slot. If the cyclic prefix of the BWP is set to extended CP, the last two bits within the bit string can be ignored by the UE. For DCI format 2_0, the first one symbol can apply if the duration of CORESET, which can be indicated in the Information Element (IE) ControlResourceSet, identified by controlResourceSetId indicates 3 symbols; the first two symbols can apply if the duration of CORESET identified by controlResourceSetId indicates 2 symbols; and the first three symbols can apply if the duration of CORESET identified by controlResourceSetId indicates 1 symbol.

A SearchSpace Information Element (IE) can be

```
-- ASN1START
-- TAG-SEARCHSPACE-START
SearchSpace ::=                           SEQUENCE {
    searchSpaceId                             SearchSpaceId,
    controlResourceSetId                      ControlResourceSetId
OPTIONAL, -- Cond SetupOnly
    monitoringSlotPeriodicityAndOffset        CHOICE {
        sl1                                       NULL,
        sl2                                       INTEGER (0..1),
        sl4                                       INTEGER (0..3),
        sl5                                       INTEGER (0..4),
        sl8                                       INTEGER (0..7),
        sl10                                      INTEGER (0..9),
        sl16                                      INTEGER (0..15),
        sl20                                      INTEGER (0..19),
        sl40                                      INTEGER (0..39),
        sl80                                      INTEGER (0..79),
        sl160                                     INTEGER (0..159),
        sl320                                     INTEGER (0..319),
        sl640                                     INTEGER (0..639),
        sl1280                                    INTEGER (0..1279),
        sl2560                                    INTEGER (0..2559)
    }                                                                                     OPTIONAL, -- Cond
Setup
    duration                                  INTEGER (2..2559)                           OPTIONAL,
-- Need R
    monitoringSymbolsWithinSlot               BIT STRING (SIZE (14))
OPTIONAL, -- Cond Setup
    nrofCandidates                            SEQUENCE {
        aggregationLevel1                         ENUMERATED {n0, n1, n2, n3, n4, n5, n6, n8},
        aggregationLevel2                         ENUMERATED {n0, n1, n2, n3, n4, n5, n6, n8},
        aggregationLevel4                         ENUMERATED {n0, n1, n2, n3, n4, n5, n6, n8},
        aggregationLevel8                         ENUMERATED {n0, n1, n2, n3, n4, n5, n6, n8},
        aggregationLevel16                        ENUMERATED {n0, n1, n2, n3, n4, n5, n6, n8}
    }                                                                                     OPTIONAL, -- Cond
Setup
    searchSpaceType                           CHOICE {
        common                                    SEQUENCE {
            dci-Format0-0-AndFormat1-0                SEQUENCE {
                ...
            }                                                                             OPTIONAL, -- Need R
            dci-Format2-0                             SEQUENCE {
                nrofCandidates-SFI                        SEQUENCE {
                    aggregationLevel1                         ENUMERATED {n1, n2}
```

```
                                  OPTIONAL, -- Need R
      aggregationLevel2       ENUMERATED {n1, n2}
                                  OPTIONAL, -- Need R
      aggregationLevel4       ENUMERATED {n1, n2}
                                  OPTIONAL, -- Need R
      aggregationLevel8       ENUMERATED {n1, n2}
                                  OPTIONAL, -- Need R
      aggregationLevel16      ENUMERATED {n1, n2}
                                  OPTIONAL -- Need R
    },
    ...
  }                                                                    OPTIONAL, -- Need R
    dci-Format2-1             SEQUENCE {
    ...
  }                                                                    OPTIONAL, -- Need R
    dci-Format2-2             SEQUENCE {
    ...
  }                                                                    OPTIONAL, -- Need R
    dci-Format2-3             SEQUENCE {
      dummy1                  ENUMERATED {sl1, sl2, sl4, sl5, sl8, sl10, sl16, sl20}
OPTIONAL, -- Cond Setup
      dummy2                  ENUMERATED {n1, n2},
      ...
    }                                                                  OPTIONAL -- Need R
  },
  ue-Specific                 SEQUENCE {
    dci-Formats               ENUMERATED {formats0-0-And-1-0, formats0-1-And-1-
1},
    ...
  }
}                                                                      OPTIONAL -- Cond
Setup
}
-- TAG-SEARCHSPACE-STOP
-- ASN1STOP
The ControlResourceSet IE can be
-- ASN1START
-- TAG-CONTROLRESOURCESET-START
ControlResourceSet ::=        SEQUENCE {
  controlResourceSetId          ControlResourceSetId,
  frequencyDomainResources      BIT STRING (SIZE (45)),
  duration                    INTEGER (1..maxCoReSetDuration),
  cce-REG-MappingType           CHOICE {
    interleaved                 SEQUENCE {
      reg-BundleSize              ENUMERATED {n2, n3, n6},
      interleaverSize             ENUMERATED {n2, n3, n6},
      shiftIndex                INTEGER(0..maxNrofPhysicalResourceBlocks-1)
OPTIONAL -- Need S
    },
    nonInterleaved            NULL
  },
  precoderGranularity         ENUMERATED {sameAsREG-bundle, allContiguousRBs},
  tci-StatesPDCCH-ToAddList       SEQUENCE(SIZE (1..maxNrofTCI-StatesPDCCH)) OF
TCI-StateId OPTIONAL, -- Cond NotSIB1-initialBWP
  tci-StatesPDCCH-ToReleaseList   SEQUENCE(SIZE (1..maxNrofTCI-StatesPDCCH)) OF
TCI-StateId OPTIONAL, -- Cond NotSIB1-initialBWP
  tci-PresentInDCI            ENUMERATED {enabled}
OPTIONAL, -- Need S
  pdcch-DMRS-ScramblingID     INTEGER (0..65535)
OPTIONAL, -- Need S
  ...
}
-- TAG-CONTROLRESOURCESET-STOP
-- ASN1STOP
```

According to at least some embodiments, supporting URLLC with additional PDCCH monitoring opportunities in terms of number of non-overlapping CCEs or number of BDs in a slot can ensure the latency for at least some of the URLLC use cases.

According to at least some embodiments, the time/frequency resources corresponding to SSs and their associated CORESETs can be higher layer configured, leading to higher layer configuration of PDCCH monitoring occasions. In cases that an UL transmission overlaps in the time/frequency resources corresponding to SSs and their associated CORESETs, the corresponding PDCCH monitoring occasion(s) can be wasted as the UE would not monitor PDCCH candidates there. Such wastage can lead to additional latency in scheduling URLLC traffic depending on how frequent the PDCCH monitoring occasions can be.

According to at least some embodiments, some of the symbols in a slot in New Radio (NR) can be 'flexible' symbols and upon a slot format indication, such as in a DCI with DCI format 2_0, can be determined as UL or DL symbols.

In an embodiment, the UE, upon reception of an indication of UL transmission overlapping with a first set of time-frequency resources configured for a first set of SSs associated with a DCI format, can determine a second set of time-frequency resources configured for a second set of SSs associated with the DCI format. The UE can be configured with the first set of time-frequency resources for the first set of SSs associated with the DCI format. The UE can be configured with the second set of time-frequency resources for the second set of SSs associated with the DCI format. The UE can monitor PDCCH candidates in the second set of time-frequency resources if the UE receives an indication of UL transmission overlapping with the first set of time-frequency resources, otherwise the UE can monitor PDCCH candidates in the first set of time-frequency resources. In some embodiments, the frequency resources of the first set of time-frequency resources and the second set of time-frequency resources can be the same. In some embodiments, the UE can monitor PDCCH candidates in the second set of time-frequency resources if the UE receives an indication of UL transmission overlapping with the first set of time-frequency resources and the second set of time-frequency resources does not cross a boundary of a window of symbols, such as a slot boundary or a half of slot boundary. In some embodiments, the UE can determine the second set of time-frequency resources based on the first set of time-frequency resources, and the first set of time-frequency resources can be configured for the UE. The UE can further determine the second set of time-frequency resources based on at least one of the duration of the UL transmission overlapping with the first set of time-frequency resources, and a slot/half-slot/mini-slot boundary, where a PDCCH monitoring occasion may not cross the boundary.

Figure 2:
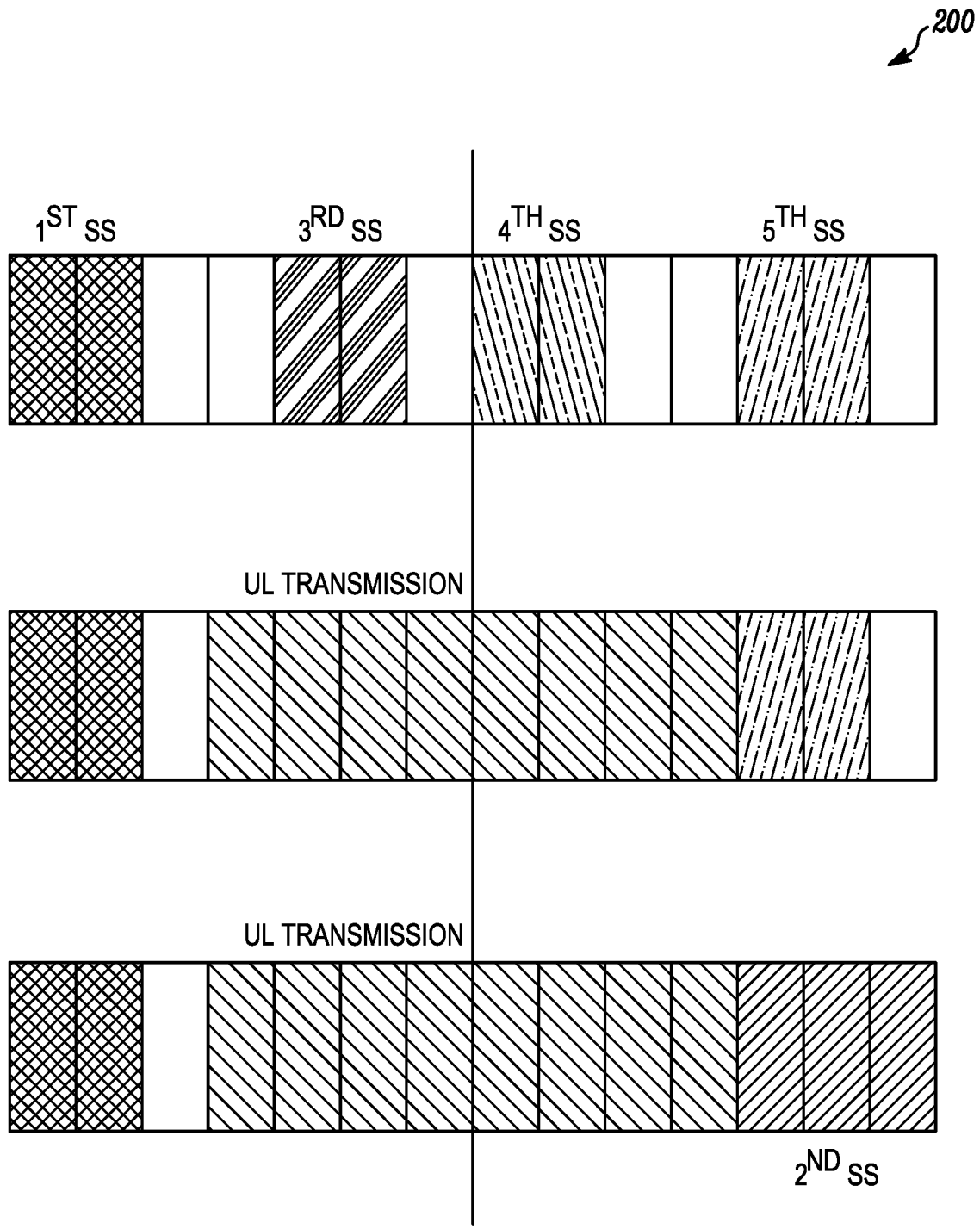
FIG. 2 is an example illustration of using a $2^{nd}$ SS instead of $3^{rd}$, $4^{th}$, and $5^{th}$ SSs when $3^{rd}$ and $4^{th}$ SSs overlap with an UL transmission according to a possible embodiment.

FIG. 2 is an example illustration 200 of using a $2^{nd}$ SS instead of $3^{rd}$, $4^{th}$, and $5^{th}$ SSs when $3^{rd}$ and $4^{th}$ SSs overlap with an UL transmission according to a possible embodiment. The example in the illustration 200, there can be no overlap of UL transmission with the $5^{th}$ SS. However, to accommodate more PDCCH candidates/non-overlapping CCEs, the $2^{nd}$ SS can be used instead of the $5^{th}$ SS. In an embodiment, the UE can determine some parameters of the $2^{nd}$ SS, such as one or more of CORESET index, first symbol, time duration, and frequency resources, based on a dynamic indication. A dynamic indication can include the UL scheduling DCI. For instance, the UL scheduling DCI can indicate the beginning symbol of the $2^{nd}$ SS and a CORESET index associated with the SS. In a related embodiment, the UE can choose to not monitor the $5^{th}$ SS if there is time and/or frequency overlap between the $2^{nd}$ SS and the $5^{th}$ SS. In another embodiment additional rules for monitoring can apply, such as if $2^{nd}$ SS and $5^{th}$ SS belong to different CORESETs, then both can be monitored. In a related embodiment, certain non-overlapping CCEs/PDCCH candidates can be monitored from the $2^{nd}$ SS to respect the BD/CCE limitations of PDCCH monitoring.

In some embodiments, the second set of SSs can be configured by higher layer signaling and the UE can monitor up to the same number of candidates as in the first SS set in the second SS set. In some embodiments, candidates with higher Aggregation Level (AL) can be prioritized to be monitored in the second set of SSs to respect the maximum allowed number of BDs/PDCCH candidates per a time window, such as a slot or half-a-slot. In some embodiments, the second set of SSs can be configured by higher layer signaling and the UE can monitor the PDCCH candidates in the second set of SSs respecting a maximum allowed number of non-overlapping CCEs per a time window, such as a slot or half-a-slot.

In some embodiments, the UE can prioritize CCEs with indexes below or above a threshold, or CCEs corresponding to candidates with higher ALs or candidates with lower ALs. In some embodiments, the second set of SSs can be monitored instead of a first set of SSs or a third set of SSs.

Figure 3:
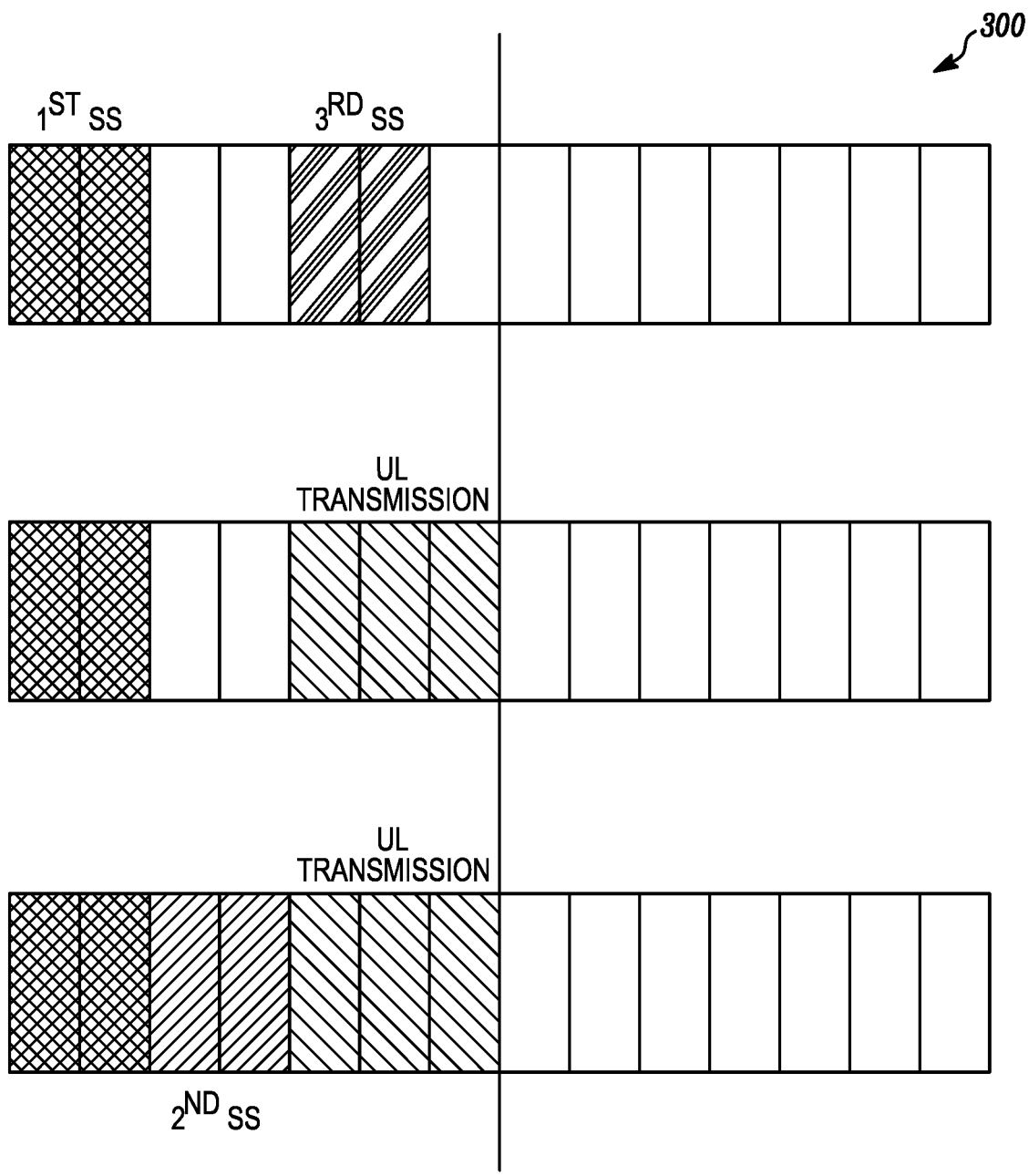
FIG. 3 is an example illustration of using a $2^{nd}$ SS instead of a $3^{rd}$ SS when the $3^{rd}$ SS overlaps with an UL transmission according to a possible embodiment.

FIG. 3 is an example illustration 300 of using a $2^{nd}$ SS instead of a $3^{rd}$ SS when the $3^{rd}$ SS overlaps with an UL transmission according to a possible embodiment.

Figure 4:
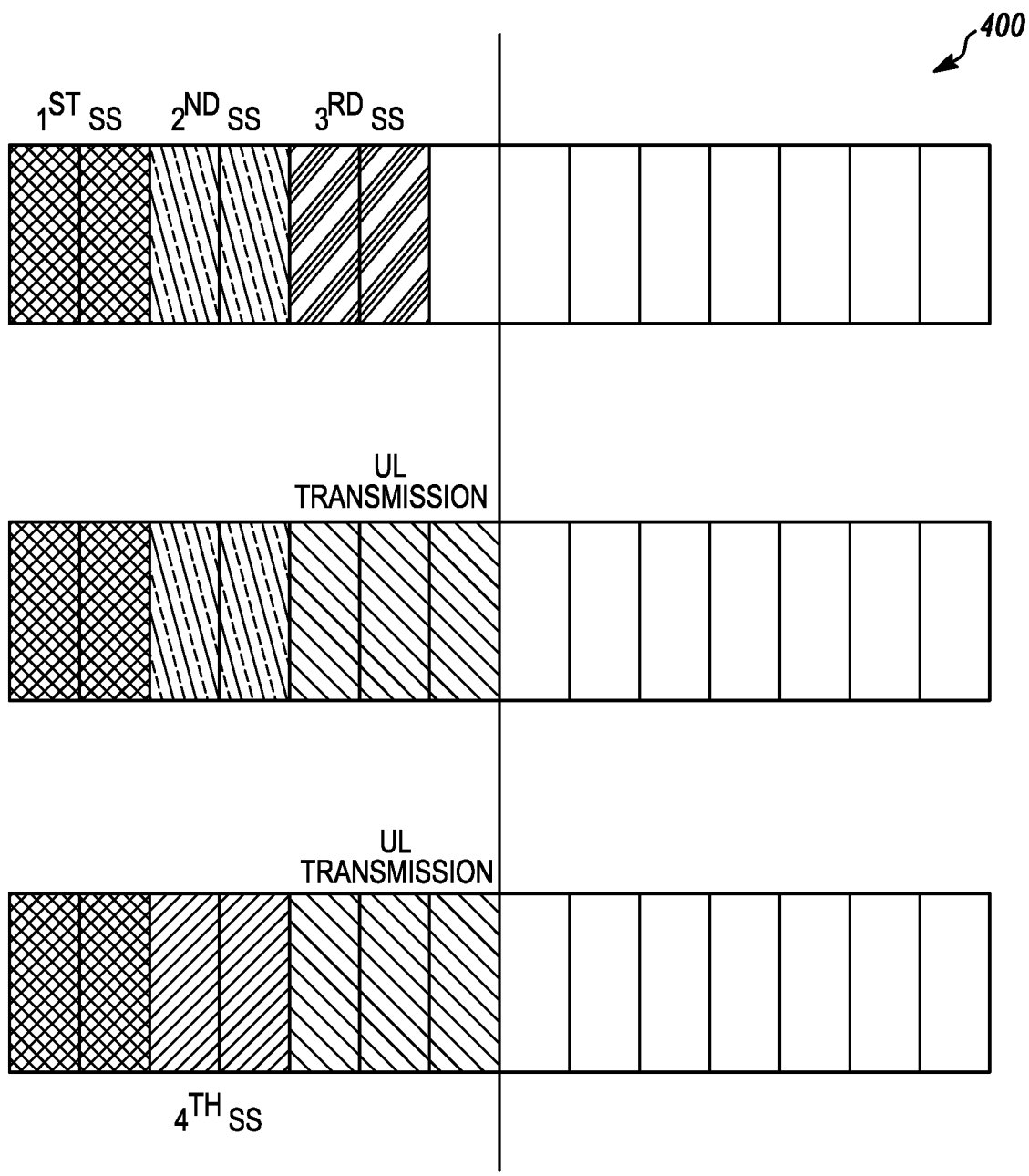
FIG. 4 is an example illustration of using a $4^{th}$ SS instead of a $2^{nd}$ SS when a $3^{rd}$ SS overlaps with UL transmission according to a possible embodiment.

FIG. 4 is an example illustration 400 of using a $4^{th}$ SS instead of a $2^{nd}$ SS when a $3^{rd}$ SS overlaps with UL transmission according to a possible embodiment. The $4^{th}$ SS can have more PDCCH candidates, in total or for a particular AL, or more non-overlapping CCEs. In some embodiments both the $2^{nd}$ and $4^{th}$ SS can be monitored.

The $4^{th}$ SS, can have more PDCCH candidates, in total or for a particular AL, or more non-overlapping CCEs compared to the $2^{nd}$ SS. Upon overlap of an UL transmission with at least one SS, such as the $3^{rd}$ SS, in a slot, another SS, such as the $4^{th}$ SS, can be monitored instead of the $2^{nd}$ SS. In another implementation, upon overlap of an UL transmission with at least one SS, such as the $3^{rd}$ SS, in a slot, another SS, such as the $4^{th}$ SS, can be monitored, and both $2^{nd}$ and $4^{th}$ SSs can be monitored or some candidates of these SSs can be monitored.

In another embodiment, the time-frequency resources of the second or alternate SS can be different than the first SS set, such as the CORESET or the number of candidates or AL can be different.

In another embodiment, the CORESET of the alternate SS, such as the $2^{nd}$ SS set can be the same as the CORESET of the first SS set so the same TCI state can be applicable to PDCCH candidates of both SS sets.

In another embodiment, instead of using the same TCI state/CORESET, the TCI state corresponding to the CORESET of the second SS set can be within the same activated TCI state sets for PDCCH to avoid monitoring an additional TCI state for this case (case of using the alternate SS set), and not potentially exceeding the number of TCI state monitoring capability of the UE when the alternate SS needs to be monitored.

In some embodiments, there can be multiple alternative SS set candidates, such as the $2^{nd}$ SS set, a $3^{rd}$ SS set, a $4^{th}$ SS set, etc., and the UE can determine which alternative SS set can be monitored. In an embodiment, a closest SS set, such as in the time-domain, to the SS overlapping with an UL transmission can be selected such that the selected alternative SS does not overlap with the UL transmission. In another embodiment, the selected alternative SS can be the one that has the same CORESET index as the SS overlapped with the UL transmission. In another embodiment, the selected alternative SS can be the one that has the highest CORESET index with the same TCI state as the SS overlapped with the UL transmission. In another embodiment, the selected alternative SS can be the one that has the highest CORESET index with the TCI state among the activated TCI states for PDCCH. In another embodiment, the selected alternative SS can have a CORESET that can have the same or fewer numbers of symbols as the CORESET of the first SS. In another embodiment, the selected alternative SS can be associated with a CORESET that can have the same precoding granularity as the CORESET of the first SS. In another embodiment, the selected alternative SS can be the one such that for any two PDCCH monitoring occasions, in the same or different SSs, there can be a minimum time separation of X OFDM symbols, including the cross-slot boundary case, between the start of two spans. Each span can be of length up to Y consecutive OFDM symbols in which PDCCH can be configured to be monitored with same start symbol. X and Y can be based on UE capability signaling. Example, candidate value sets for (X, Y) can include {{(7, 3)}, {(4, 3) and (7, 3)}, {(2, 2) and (4, 3) and (7, 3)}}.

In an embodiment, the alternate SS selection or configuration can be constrained so as to respect at least one of, the maximum number of monitored PDCCH candidates per slot for a DL BWP, the maximum number of non-overlapped CCEs per slot for a DL BWP, and/or the maximum number of TCI state monitoring capability.

In some embodiments if the UE is capable of or enabled with DL CA operation, cross-carrier scheduling can be used to avoid scenarios where UL transmission overlaps with a SS set. For example, for TDD carriers, scheduling can be performed using another DL cell, such as a non-TDD carrier. In another embodiment, if the first SS set can be overlapped with the UL transmission, the UE can monitor an alternative SS in another carrier. In one example, such opportunistic monitoring on another carrier can be possible if a certain timing condition can be met, such as the UL grant scheduling the UL transmission can be received a certain time in advance compared to the start of the first SS set. In one example, the UE can monitor a SS with the same searchSpaceId of the scheduling cell in the scheduled cell, if the SS searchSpaceId is configured in the scheduled cell active DL BWP.

In some embodiments the UE can monitor the first SS with the same searchSpaceId in the first carrier/cell for PUSCH/PDSCH transmissions/receptions in the first carrier/cell, and upon detection of an overlap of resources of the UL transmission with those of the first SS set, the UE can monitor the first SS in the second carrier/cell.

In at least some of the above embodiments, if the UE misses an UL grant indicating the UL transmission, the UE can monitor the first SS set. Many embodiments can be at least applicable for TDD, primarily, for single cell/carrier case.

UL transmission can be scheduled by an UL grant or by a DL grant, such as in case of PUCCH. UL transmission can be PUSCH, PUCCH, RACH, SRS, etc. In one example, in the above embodiments, instead of UL grant for PUSCH transmission, DL assignment corresponding to PUCCH transmission can be used. In one example, the DL assignment can carry information of selection of one of the multiple alternative SSs.

In some operations, the UE may not expect any two PDCCH monitoring occasions on an active DL BWP, for a same SS set or for different SS sets, in a same CORESET to be separated by a non-zero number of symbols that can be smaller than the CORESET duration.

If a UE can be configured by higher layers to receive a PDCCH, or a Physical Data Shared Channel (PDSCH), or a Channel State Information Reference Signal (CSI-RS) in a set of symbols of a slot, the UE can receive the PDCCH, the PDSCH, or the CSI-RS if the UE does not detect a DCI format 0_0, DCI format 0_1, DCI format 1_0, DCI format 1_1, or DCI format 2_3 that indicates to the UE to transmit a Physical Uplink Shared Channel (PUSCH), a Physical Uplink Control Channel (PUCCH), a Physical Random Access Channel (PRACH), or a Sounding Reference Symbol (SRS) in at least one symbol of the set of symbols of the slot. Otherwise, the UE may not receive the PDCCH, or the PDSCH, or the CSI-RS in the set of symbols of the slot.

A UE may not expect to be provided a first symbol and a number of consecutive symbols for a CORESET that results to a PDCCH candidate mapping to symbols of different slots.

In at least some embodiments, an alternative SS, such as those associated to a URLLC DCI format, can be monitored for PDCCH candidates in cases where there is an overlap of an UL transmission with a first SS, such as those associated to a URLLC DCI format. At least some embodiments can use various methods to determine the alternative SS and can provide for monitoring behavior for the alternative SS.

According to a possible embodiment, a UE can receive a configuration of a first SS for monitoring a control channel, such as PDCCH, candidates over a first set of symbols, such as OFDM symbols. The UE can receive a configuration of an alternative set of an alternative set of SSs containing at least a second SS for monitoring a control channel, such as PDCCH, candidates over a second set of symbols which can be OFDM symbols. The UE can receive an UL grant scheduling an UL transmission over a third set of symbols, such as OFDM symbols. If the first set and the third set of symbols do not overlap, the UE can monitor PDCCH candidates in the first SS. If the first set and the third set of symbols overlap, the UE can monitor PDCCH candidates in the second SS. In some embodiments the first and the second SSs can be different in at least one symbol.

According to a possible embodiment, an alternative set of SSs can contain at least two SSs. The UE can determine the second SS from the SSs of the alternative set of SSs based on one or more of, an indication in an UL grant, a proximity of a candidate SS from the alternative set of SSs with the first SS, and/or time domain resources assigned via the UL grant for a UL transmission.

According to a possible embodiment, the first SS can be in a first carrier/cell and the second SS can be in a second carrier/cell. The second carrier/cell can be different than the first carrier/cell.

According to a possible embodiment, a subset of PDCCH candidates of the second SS can be monitored. The subset can be based on one or more of PDCCH monitoring restrictions, including limitations on the number of PDCCH candidates, number of blind decodes, number of non-overlapping CCEs, and/or number of TCI state monitoring capability in a certain window of time. The window of time can be a slot, half of a slot, or a set of symbols.

In some embodiments the first and the second SSs can have the same TCI state index.

Figure 5:
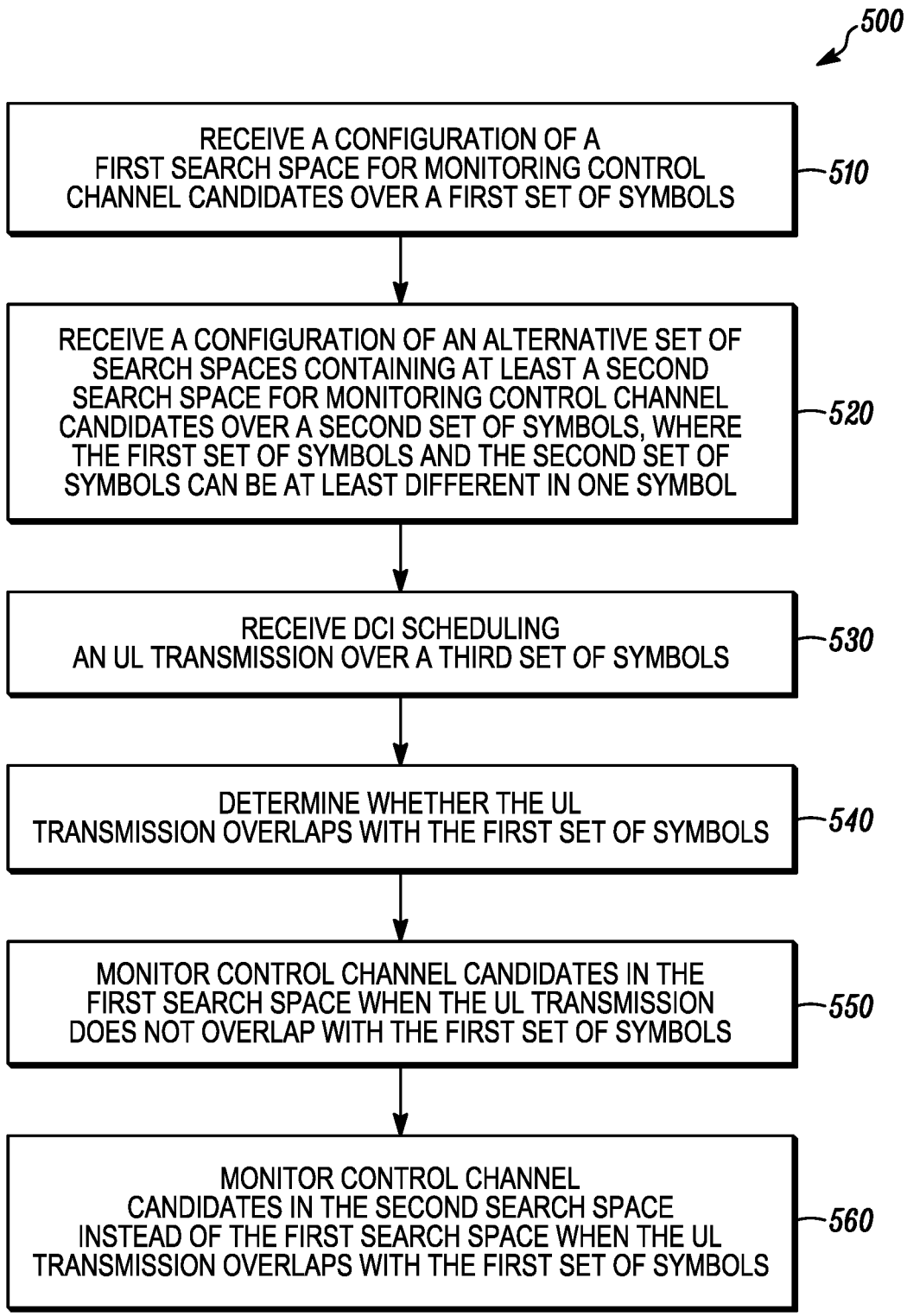
FIG. 5 is an example flowchart illustrating the operation of a wireless communication device according to a possible embodiment.

FIG. 5 is an example flowchart 500 illustrating the operation of a wireless communication device, such as the UE 110, according to a possible embodiment. At 510, a configuration of a first SS for monitoring control channel candidates over a first set of symbols can be received. At 520, a configuration of an alternative set of SSs containing at least a second SS for monitoring control channel candidates over a second set of symbols can be received. The first set of symbols and the second set of symbols can be at least different in one symbol.

At 530, DCI scheduling an UL transmission over a third set of symbols can be received. At 540, a determination can be made as to whether the UL transmission overlaps with the first set of symbols.

At 550, control channel candidates in the first SS can be monitored when the UL transmission does not overlap with the first set of symbols. At 560, control channel candidates can be monitored in the second SS instead of the first SS when the UL transmission overlaps with the first set of symbols.

According to possible embodiments, the control channel candidates in the second SS may not be monitored if the UL transmission and the first set do not overlap. The control channel can be a PDCCH. The symbols can be OFDM symbols. The received DCI can be a DL DCI that can schedule a PDSCH and a corresponding HARQ-ACK, can be an UL DCI that can schedule PUSCH, and/or can be any other DCI. The first set of symbols and the second set of symbols may not overlap.

According to a possible embodiment, the first SS and the second SS can be associated with a certain DCI format. For example, the first and second SSs can be at least associated with an URLLC DCI format.

According to a possible embodiment, a duration of a CORESET of the first SS can have a longer duration than a duration of a CORESET of the second SS. For example, the selected alternative SS can be the one whose CORESET has the same or fewer number of symbols as the CORESET of the first SS.

According to a possible embodiment, the alternative set of SSs can contain at least two SSs. The second SS can be determined from SSs of the alternative set of SSs based on an indication in the DCI, based on a time difference between the second SS and the first SS, and/or based on the third set of symbols. For example, a closest SS set, such as in the time-domain, to the SS overlapping with an UL transmission can be selected such that the selected alternative SS does not overlap with the UL transmission.

According to a possible embodiment, the first SS can be in a first carrier, the second SS can be in a second carrier, and the second carrier can be different than the first carrier.

According to a possible embodiment, a set of parameters of the second SS can be determined based on the DCI. The set of parameters can include the beginning symbol of the second SS and/or a CORESET index associated with the second SS. The set of parameters can also include a time duration of the second SS and/or frequency resources of the second SS. The second SS can be determined based on the set of parameters and based on the configuration of the alternative set of SSs.

According to a possible embodiment, monitoring control channel candidates in the second SS can include monitoring control channel candidates of the second SS associated with a set of CCEs. The set of CCEs can contain at most a maximum number of non-overlapping CCEs in a certain time window. The certain time window can be a slot, a half slot, and/or a number of symbols.

According to a possible embodiment, the second set of symbols may not cross a boundary of a window of symbols. For example, the UE can monitor PDCCH candidates in the second set of time-frequency resources if the UE receives an indication of UL transmission overlapping with the first set of time-frequency resources and if the second set of time-frequency resources do not cross a boundary of a window of symbols, such as a slot boundary or a half of slot boundary.

According to a possible embodiment, the CORESET of the second SS can be the same as a CORESET of the first SS.

According to a possible embodiment, the DCI can be received a certain time before the start of the first SS. For example, the UL grant scheduling the UL transmission can be received certain time in advance compared to the start of the first SS set.

According to a possible embodiment, determining a subset of control channel candidates in the second SS can be determined based on at least one control channel monitoring restriction. Control channel monitoring restrictions can include limitations on a number of control channel candidates in a certain window of time, limitations on a number of blind decodes in a certain window of time, limitations on a number of non-overlapping CCEs in a certain window of time, and/or limitations on a maximum number of TCI states that can be monitored. The limitations on a maximum number of TCI states can be limitations on a maximum number of TCI states that can be activated for a PDCCH. For example, instead of using the same TCI/CORESET as the ones corresponding to the first SS, the TCI state corresponding to the CORESET of the second SS set can be within the same activated TCI state sets for PDCCH to avoid monitoring an additional TCI state for this case. The number of TCI states corresponding to, such as being monitored/activated for, the CORESET of the second SS set also may not potentially exceed the number of TCI state monitoring capability of the UE when the alternate SS needs to be monitored.

According to a possible embodiment, the first and the second SSs can have a same TCI state.

Figure 6:
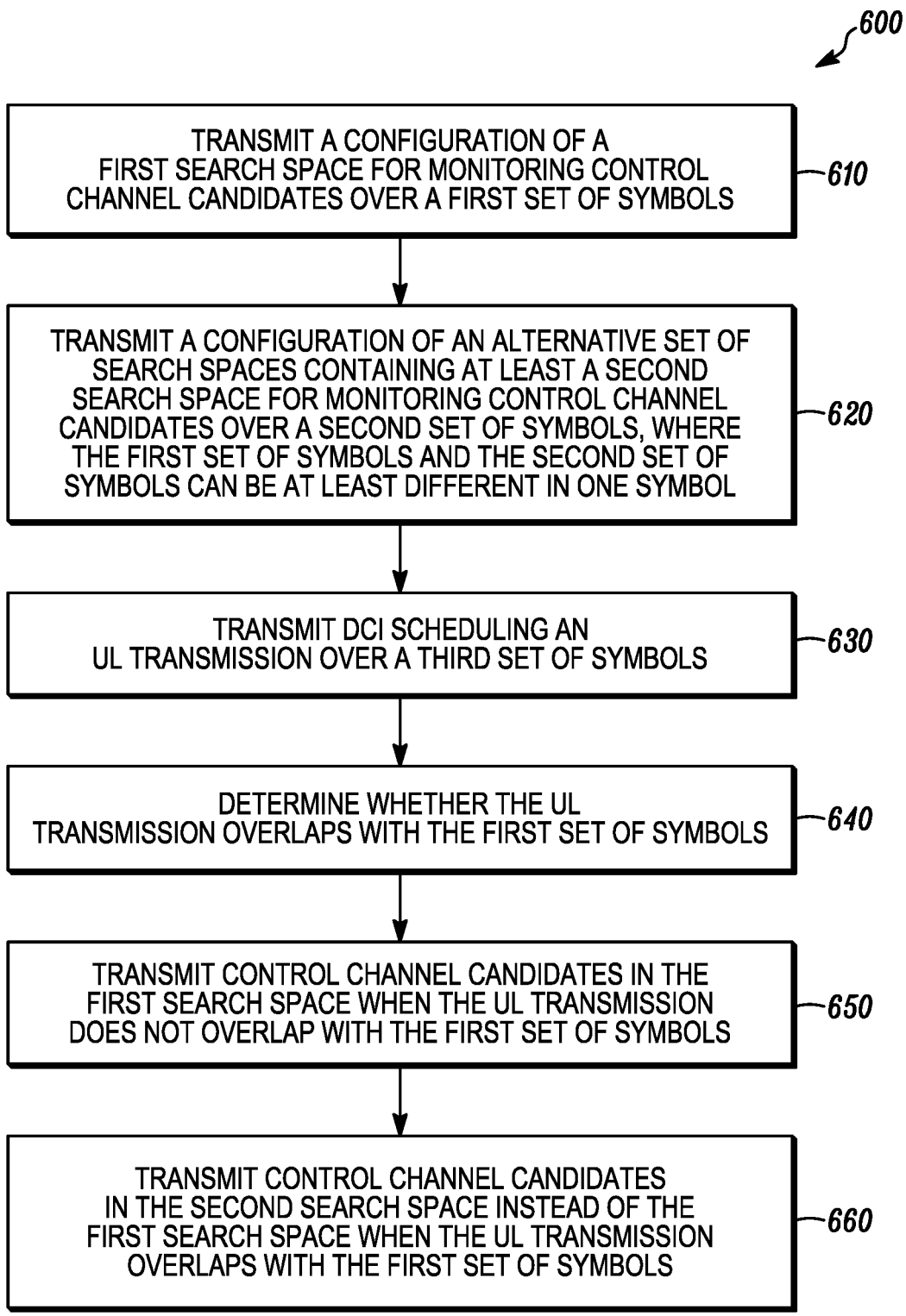
FIG. 6 is an example flowchart illustrating the operation of a wireless communication device according to a possible embodiment.

FIG. 6 is an example flowchart 600 illustrating the operation of a wireless communication device, such as the network entity 120, according to a possible embodiment. At 610, a configuration of a first SS for monitoring control channel candidates over a first set of symbols can be transmitted. At 620, a configuration of an alternative set of SSs containing at least a second SS for monitoring control channel candidates over a second set of symbols can be transmitted. The first set of symbols and the second set of symbols can be at least different in one symbol. At 630, DCI scheduling an UL transmission over a third set of symbols can be transmitted.

At 640, a determination can be made as to whether the UL transmission overlaps with the first set of symbols. At 650, a control channel can be selected to be one of the control channel candidates in the first SS and the control channel can be transmitted when the UL transmission does not overlap with the first set of symbols. At 660, the control channel can be selected to be one of the control channel candidates and the control channel can be transmitted in the second SS instead of the first SS when the UL transmission overlaps with the first set of symbols.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 7:
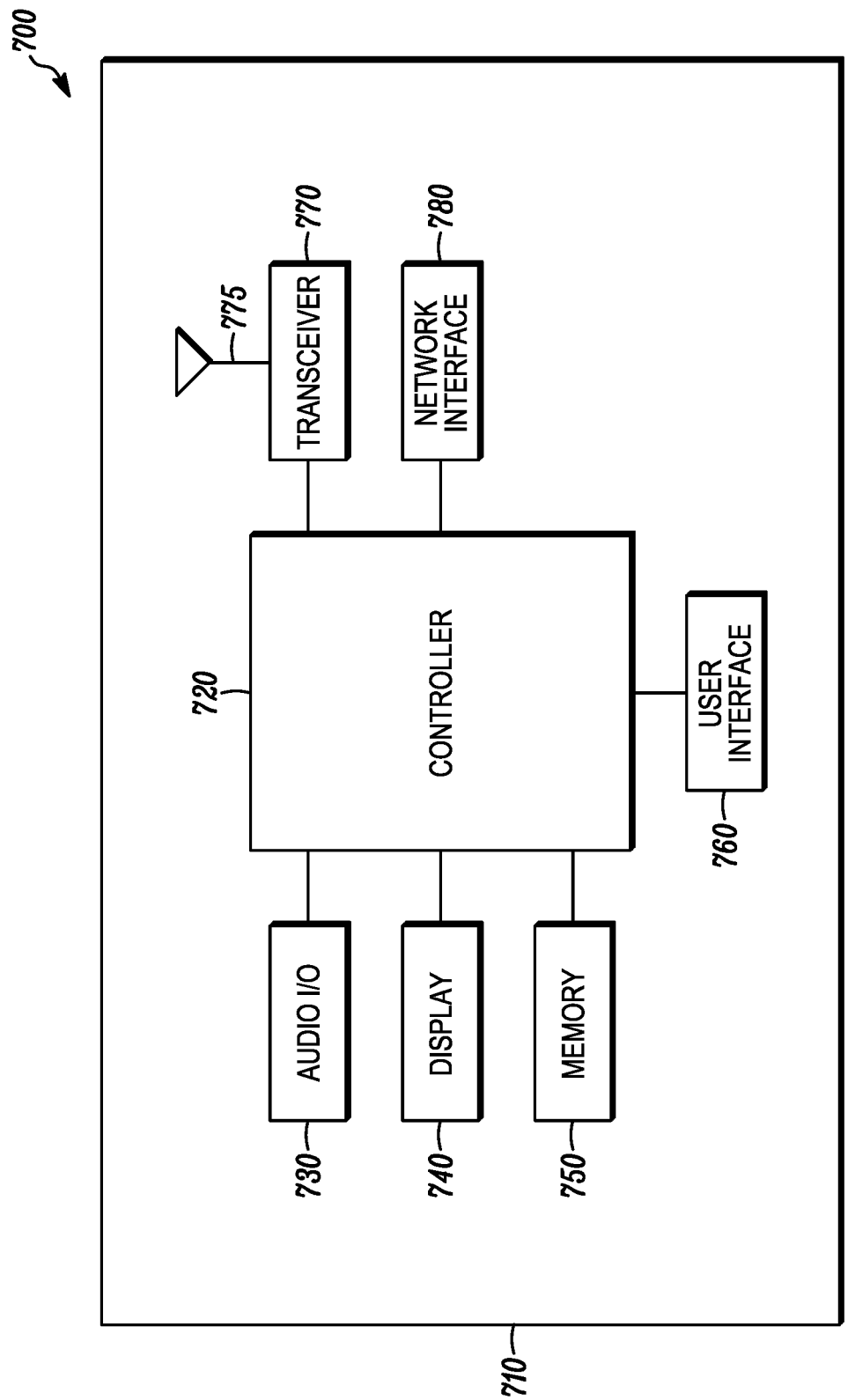
FIG. 7 is an example block diagram of an apparatus according to a possible embodiment.

FIG. 7 is an example block diagram of an apparatus 700, such as the UE 110, the network entity 120, or any other wireless communication device disclosed herein, according to a possible embodiment. The apparatus 700 can include a housing 710, a controller 720 coupled to the housing 710, audio input and output circuitry 730 coupled to the controller 720, a display 740 coupled to the controller 720, a memory 750 coupled to the controller 720, a user interface 760 coupled to the controller 720, a transceiver 770 coupled to the controller 720, at least one antenna 775 coupled to the transceiver 770, and a network interface 780 coupled to the controller 720. The apparatus 700 may not necessarily include all of the illustrated elements for different embodiments of the present disclosure. The apparatus 700 can perform the methods described in all the embodiments.

The display 740 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 770 can be one or more transceivers that can include a transmitter and/or a receiver. The audio input and output circuitry 730 can include a microphone, a speaker, a transducer, or any other audio input and output circuitry. The user interface 760 can include a keypad, a keyboard, buttons, a touch pad, a joystick, a touch screen display, another additional display, or any other device useful for providing an interface between a user and an electronic device. The network interface 780 can be a Universal Serial Bus (USB) port, an Ethernet port, an infrared transmitter/receiver, an IEEE 1394 port, a wireless transceiver, a WLAN transceiver, or any other interface that can connect an apparatus to a network, device, and/or computer and that can transmit and receive data communication signals. The memory 750 can include a Random-Access Memory (RAM), a Read Only Memory (ROM), an optical memory, a solid-state memory, a flash memory, a removable memory, a hard drive, a cache, or any other memory that can be coupled to an apparatus.

The apparatus 700 or the controller 720 may implement any operating system, such as Microsoft Windows®, UNIX®, LINUX®, Android™, or any other operating system. Apparatus operation software may be written in any programming language, such as C, C++, Java, or Visual Basic, for example. Apparatus software may also run on an application framework, such as, for example, a Java® framework, a .NET® framework, or any other application framework. The software and/or the operating system may be stored in the memory 750, elsewhere on the apparatus 700, in cloud storage, and/or anywhere else that can store software and/or an operating system. The apparatus 700 or the controller 720 may also use hardware to implement disclosed operations. For example, the controller 720 may be any programmable processor. Furthermore, the controller 720 may perform some or all of the disclosed operations. For example, at least some operations can be performed using cloud computing and the controller 720 may perform other operations. At least some operations can also be performed computer executable instructions executed by at least one computer processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 720 may be any controller or processor device or devices capable of operating an apparatus and implementing the disclosed embodiments. Some or all of the additional elements of the apparatus 700 can also perform some or all of the operations of the disclosed embodiments.

In operation, the apparatus 700 can perform the methods and operations of the disclosed embodiments. The transceiver 770 can transmit and receive signals, including data signals and control signals that can include respective data and control information. The controller 720 can generate and process the transmitted and received signals and information.

In operation according to a possible embodiment, the transceiver 770 can receive a configuration of a first SS for monitoring control channel candidates over a first set of symbols. The transceiver 770 can receive a configuration of an alternative set of SSs containing at least a second SS for monitoring control channel candidates over a second set of symbols. The first set of symbols and the second set of symbols can be at least different in one symbol. The transceiver 770 can receive a DCI scheduling an UL transmission over a third set of symbols.

The controller 720 can determine whether the UL transmission overlaps with the first set of symbols. The controller 720 can monitor control channel candidates in the first SS when the UL transmission does not overlap with the first set of symbols. The controller 720 can monitor control channel candidates in the second SS instead of the first SS when the UL transmission overlaps with the first set of symbols.

According to a possible embodiment, the first SS and the second SS can be associated with a certain DCI format.

According to a possible embodiment, a duration of a CORESET of the first SS can have a longer duration than a duration of a CORESET of the second SS.

According to a possible embodiment, the alternative set of SSs can contain at least two SSs. The controller 720 can determine the second SS from SSs of the alternative set of SSs based on an indication in the DCI, a time difference between the second SS and the first SS, and/or the third set of symbols.

According to a possible embodiment, wherein the first SS can be in a first carrier, the second SS can be in a second carrier, and the second carrier can be different than the first carrier.

According to a possible embodiment, the controller 720 can determine a set of parameters of the second SS based on the DCI. The set of parameters can include the beginning symbol of the second SS and/or a CORESET index associated with the second SS. The controller 720 can determine the second SS based on the set of parameters and based on the configuration of the alternative set of SSs.

According to a possible embodiment, the controller 720 can monitor control channel candidates in the second SS by monitoring control channel candidates of the second SS associated with a set of CCEs. The set of CCEs can contain at most a maximum number of non-overlapping CCEs in a certain time window.

According to a possible embodiment, the second set of symbols may not cross a boundary of a window of symbols.

At least some methods of this disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

At least some embodiments can improve operation of the disclosed devices. Also, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of" "at least one selected from the group of" or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. An apparatus comprising:
    a controller configured to control operations of the apparatus; and
    a transceiver coupled to the controller, where the transceiver
        transmits a configuration of a first search space for monitoring control channel candidates over a first set of symbols;
        transmits a configuration of an alternative set of search spaces containing at least a second search space for monitoring control channel candidates over a second set of symbols, where the first set of symbols and the second set of symbols are at least different in one symbol,
            where control channel candidates are monitored in the first search space when an uplink transmission does not overlap with the first set of symbols, and
            where control channel candidates are monitored in the second search space instead of the first search space when the uplink transmission overlaps with the first set of symbols; and
        transmits downlink control information scheduling an uplink transmission over a third set of symbols, where a determination is made as to whether the uplink transmission overlaps with the first set of symbols.

2. The apparatus according to claim 1, wherein the first search space and the second search space are associated with a certain downlink control information format.

3. The apparatus according to claim 1, wherein a control resource set of the first search space has a longer duration than a duration of a control resource set of the second search space.

4. The apparatus according to claim 1, wherein the alternative set of search spaces contains at least two search spaces, and the second search space is determined from search spaces of the alternative set of search spaces based on at least selected from
    an indication in the downlink control information,
    a time difference between the second search space and the first search space, and
    the third set of symbols.

5. The apparatus according to claim 1,
    wherein the first search space is in a first carrier,
    wherein the second search space is in a second carrier, and
    wherein the second carrier is different than the first carrier.

6. The apparatus according to claim 1,
    wherein a set of parameters of the second search space is determined based on the downlink control information, where the set of parameters include at least one selected from
        a beginning symbol of the second search space, and
        a control resource set index associated with the second search space, and
    wherein the second search space is determined based on the set of parameters and based on the configuration of the alternative set of search spaces.

7. The apparatus according to claim 1, wherein the second set of symbols does not cross a boundary of a window of symbols.

8. The apparatus according to claim 1, wherein the control resource set of the second search space is the same as a control resource set of the first search space.

9. The apparatus according to claim 1, wherein the downlink control information is transmitted a certain time before the start of the first search space.

10. The apparatus according to claim 1,
    wherein a subset of control channel candidates in the second search space are determined based on at least one of control channel monitoring restrictions, and
    wherein the control channel monitoring restrictions include at least one selected from
        limitations on a number of control channel candidates in a certain window of time,
        limitations on a number of blind decodes in a certain window of time,
        limitations on a number of non-overlapping control channel elements in a certain window of time, and
        limitations on a maximum number of transmission configuration indication states that can be monitored.

11. The apparatus according to claim 1, wherein the first and the second search spaces have a same transmission configuration indication state.

12. A method at a network entity, the method comprising:
    transmitting a configuration of a first search space for monitoring control channel candidates over a first set of symbols;
    transmitting a configuration of an alternative set of search spaces containing at least a second search space for monitoring control channel candidates over a second set of symbols, where the first set of symbols and the second set of symbols are at least different in one symbol,
        where control channel candidates are monitored in the first search space when an uplink transmission does not overlap with the first set of symbols, and
        where control channel candidates are monitored in the second search space instead of the first search space when the uplink transmission overlaps with the first set of symbols; and transmitting downlink control information scheduling an uplink transmission over a third set of symbols, where a determination is made as to whether the uplink transmission overlaps with the first set of symbols.

13. The method according to claim 12, wherein the first search space (Original) and the second search space are associated with a certain downlink control information format.

14. The method according to claim 12, wherein a control resource set of the first search space has a longer duration than a duration of a control resource set of the second search space.

15. The method according to claim 12, wherein the alternative set of search spaces contains at least two search spaces, and the second search space is determined from search spaces of the alternative set of search spaces based on at least one of an indication in the downlink control information, a time difference between the second search space and the first search space, and the third set of symbols.

16. The method according to claim 12,
wherein the first search space is in a first carrier,
wherein the second search space is in a second carrier, and
wherein the second carrier is different than the first carrier.

17. The method according to claim 12,
wherein a set of parameters of the second search space is determined based on the downlink control information, where the set of parameters include at least one selected from a beginning symbol of the second search space, and a control resource set index associated with the second search space, and wherein the second search space is determined based on the set of parameters and based on the configuration of the alternative set of search spaces.

18. The method according to claim 12, wherein the second set of symbols does not cross a boundary of a window of symbols.

19. The method according to claim 12, wherein the control resource set of the second search space is the same as a control resource set of the first search space.

20. The method according to claim 12, wherein the downlink control information is transmitted a certain time before the start of the first search space.

* * * * *